United States Patent
Britton et al.

(10) Patent No.: US 6,925,630 B1
(45) Date of Patent: Aug. 2, 2005

(54) METHOD FOR GENERATING CODE FOR PROCESSING A DATABASE

(75) Inventors: Austen John Britton, Stockport (GB); Margaret Hazel Derbyshire, Ripon (GB); Mark Hinton, Marple (GB); David Stephen Walsh, Rawtenstall (GB)

(73) Assignee: Fujitsu Services Limited, Slough (GB)

( * ) Notice: Subject to any disclaimer, the term of this patent is extended or adjusted under 35 U.S.C. 154(b) by 547 days.

(21) Appl. No.: 09/587,888

(22) Filed: Jun. 6, 2000

(30) Foreign Application Priority Data

Jun. 22, 1999 (GB) .................................... 9914405

(51) Int. Cl.⁷ ............................................... G06F 9/44
(52) U.S. Cl. .................................................. 717/106
(58) Field of Search ....................... 707/100; 717/106, 717/130, 158, 107–109

(56) References Cited

U.S. PATENT DOCUMENTS

| | | | |
|---|---|---|---|
| 5,231,693 A * | 7/1993 | Backes et al. ............... | 700/264 |
| 5,295,222 A | 3/1994 | Wadhwa | |
| 5,640,550 A * | 6/1997 | Coker ........................... | 707/4 |
| 5,701,461 A * | 12/1997 | Dalal et al. ..................... | 707/4 |
| 5,737,592 A * | 4/1998 | Nguyen et al. ................. | 707/4 |
| 6,167,405 A * | 12/2000 | Rosensteel et al. .......... | 707/102 |
| 6,253,370 B1 * | 6/2001 | Abadi et al. ................. | 717/154 |
| 6,275,986 B1 * | 8/2001 | Ewart .......................... | 717/126 |
| 6,457,009 B1 * | 9/2002 | Bollay .......................... | 707/10 |

FOREIGN PATENT DOCUMENTS

| | | |
|---|---|---|
| GB | 2 315 891 | 2/1998 |
| GB | 2 325 761 | 12/1998 |
| WO | WO 91/14991 | 10/1991 |

OTHER PUBLICATIONS

Access 97 Macro & VBA Hanbook, by Susann Novalis, Sybex, 1997.*
"Microsoft Press Computer Dictionary: Third Edition", Microsoft Press, 1997. pp. 294-295.*
"Command" by Webopedia.com, Sep. 1996.*

* cited by examiner

*Primary Examiner*—Wei Y. Zhen
(74) *Attorney, Agent, or Firm*—Barnes & Thornburg

(57) ABSTRACT

A method is described for generating code for loading and performing other processing operations on a multi-dimensional data warehouse. Databases are defined as entity-relationship data models, using a modelling tool. A source file is created, containing instructions for processing the database, and including one or more high-level directives. At system build time, the source file is pre-processed, by replacing the directives with code, using information pulled from the data model, to generate a destination file containing the code for processing the database. At run time, the generated code is processed to replace run-time macros, indicating physical storage schemes. The generated code is then run, to process the database.

5 Claims, 2 Drawing Sheets

METHOD FOR GENERATING CODE FOR PROCESSING A DATABASE

BACKGROUND TO THE INVENTION

This invention relates to a method for generating code for processing a database, such as for example for loading a multi-dimensional data warehouse from one or more source databases.

There are already products that generate code for loading a database. In these known products, the code is generated directly from the entity-relationship model for the database. However, this approach suffers from several drawbacks. Firstly, to achieve high performance, specific tuning of the generated code is required. This makes it difficult to repeatedly build maintenance and enhancement versions of the product: typically, the directly-generated code is usable only as the starting point for a development. Secondly, the load code in practice is only part of a data warehouse solution—data extracts, automation, outside-database processing and reporting are all typical components, none of which are schema-dependent.

One object of the present invention is to provide a novel technique for generating code for processing a database, which does not suffer from these problems.

SUMMARY OF THE INVENTION

According to the invention a method for generating code for processing a database comprises the steps:
(a) defining the database in an entity-relationship data model;
(b) creating a source file containing instructions for processing the database, the instructions including one or more high-level directives; and
(c) pre-processing the source file, by replacing the directives with code, using information pulled from the data model, to generate a destination file containing the code for processing the database.

It can be seen that the present invention adopts a "pull" approach to the problem, instead of the conventional "push" approach. This significantly reduces the problem of tuning the code, since it gives the software developer control over the way the code is generated. Also, the "pull" approach does not restrict the developer to using a particular data modelling tool to create the data model.

DESCRIPTION OF AN EMBODIMENT OF THE INVENTION

One embodiment of the invention will now be described by way of example with reference to the accompanying drawings.

It is assumed in this example that a multi-dimensional data warehouse is to be loaded from a number of individual source databases. In a retail environment, for example, the source databases may hold information about point-of-sale (POS) transactions, products, promotions, customers and stores.

Figure 1:
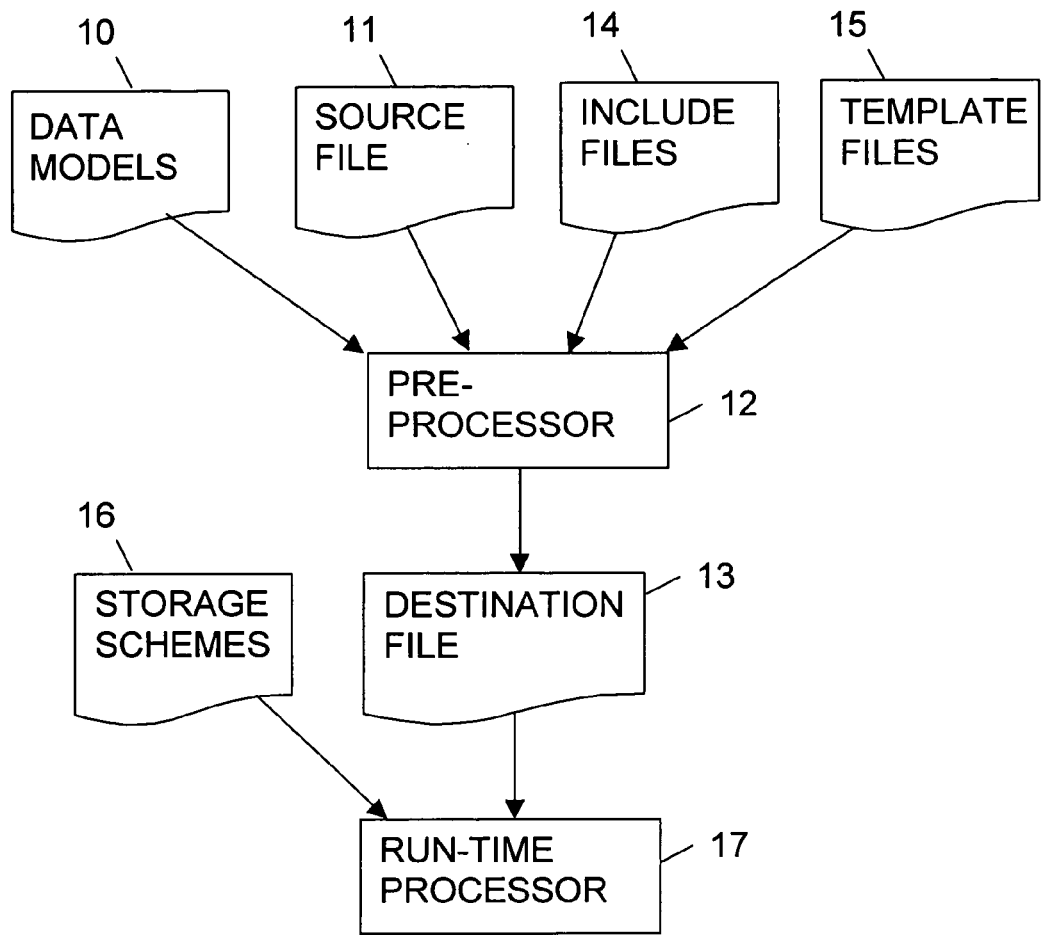
FIG. 1 is a schematic diagram showing a method for generating code for processing a database.

Referring to FIG. 1, the source databases and the data warehouse, are defined as a set of entity-relationship data models 10. These models may be produced using a commercially available modelling tool, such as ERWIN. The models include definitions of the various tables in the databases and the fields (columns) each table. The models also include additional annotations, to assist in the code generation process. These annotations define properties of the entity (table or column), such as:
   the type of a table—{fact, summary, dimensional}
   the partitioning strategy for a table—{none, <time-key>}
   the external data type of a column.

A source file 11 defines the way in which the data warehouse is to be loaded from the individual source databases, and other operations to be performed on the data, such as cleansing and de-duplicating tables. The source file 11 is written in a combination of perl and SQL, and includes a number of special high-level commands, referred to as directives.

At system build time, a pre-processor program 12 processes the source file 11, as will be described, so as to generate a destination file 13, containing code for processing the data warehouse. The pre-processor program uses information pulled from the data models 10. It also uses a set of include files 14 and template files 15, as will be described. The include files and the template files may be written in a combination of perl and SQL, or possibly any other programming language, and may also include directives.

Directives

The name of each directive is prefixed by the symbol # to identify it as such to the pre-processor. By way of example, the directives may include the following.

aggregate_table This directive instructs the pre-processor to generate SQL code to aggregate data from a specified source table into a specified destination table.

append_table This directive instructs the pre-processor to generate SQL code to append rows from a specified source table to a specified destination table.

cleanse-table This directive instructs the pre-processor to generate SQL code to perform cleansing of a specified source table, including supply of default values, deletion of irrelevant columns and addition of new columns. The result of the processing is placed in a specified destination table.

create_table This directive instructs the pre-processor to generate SQL code to create a table with a specified name. Optionally, it may specify that the table should have the same database schema as an existing table.

deduplicate_table This directive instructs the pre-processor to generate SQL code to deduplicate a specified source table (i.e. to remove records that share the same primary key, so that there remains only one record with any given primary key). The result of the processing is placed in a specified destination table.

define This directive defines a macro, i.e. a text substitution which is used throughout the rest of the pre-processing. For example, the directive "#define INTSIZE 4" indicates that the value "4" is to be substituted for "INTSIZE". Macros may contain directives and nested macro calls. A macro, once declared, never goes out of scope.

include This directive instructs the pre-processor to include code from a specified one of the include files 14.

prefix This directive instructs the pre-processor to modify any word beginning with a specified prefix, by replacing the prefix with a specified new prefix.

Prefixes allow SQL variants in naming standards, such as standards for naming temporary variables, to be accommodated. For example, a prefix "TT_" may be defined as "#" for a first database, and as " " (i.e. nothing) for a second database. All occurrences of "TT_<table-name>" will then be converted by the pre-processor to either "#<table_name>" or "<table_name>", depending on the target database.

template This directive instructs the pre-processor to include code from a specified one of the template files 15. Templates allow SQL variants that use source constructs in different orders to be accommodated. The #template directive supplies the sets of text to be inserted, and the template file itself supplies the keywords and the variant-specific ordering.

Figure 2:
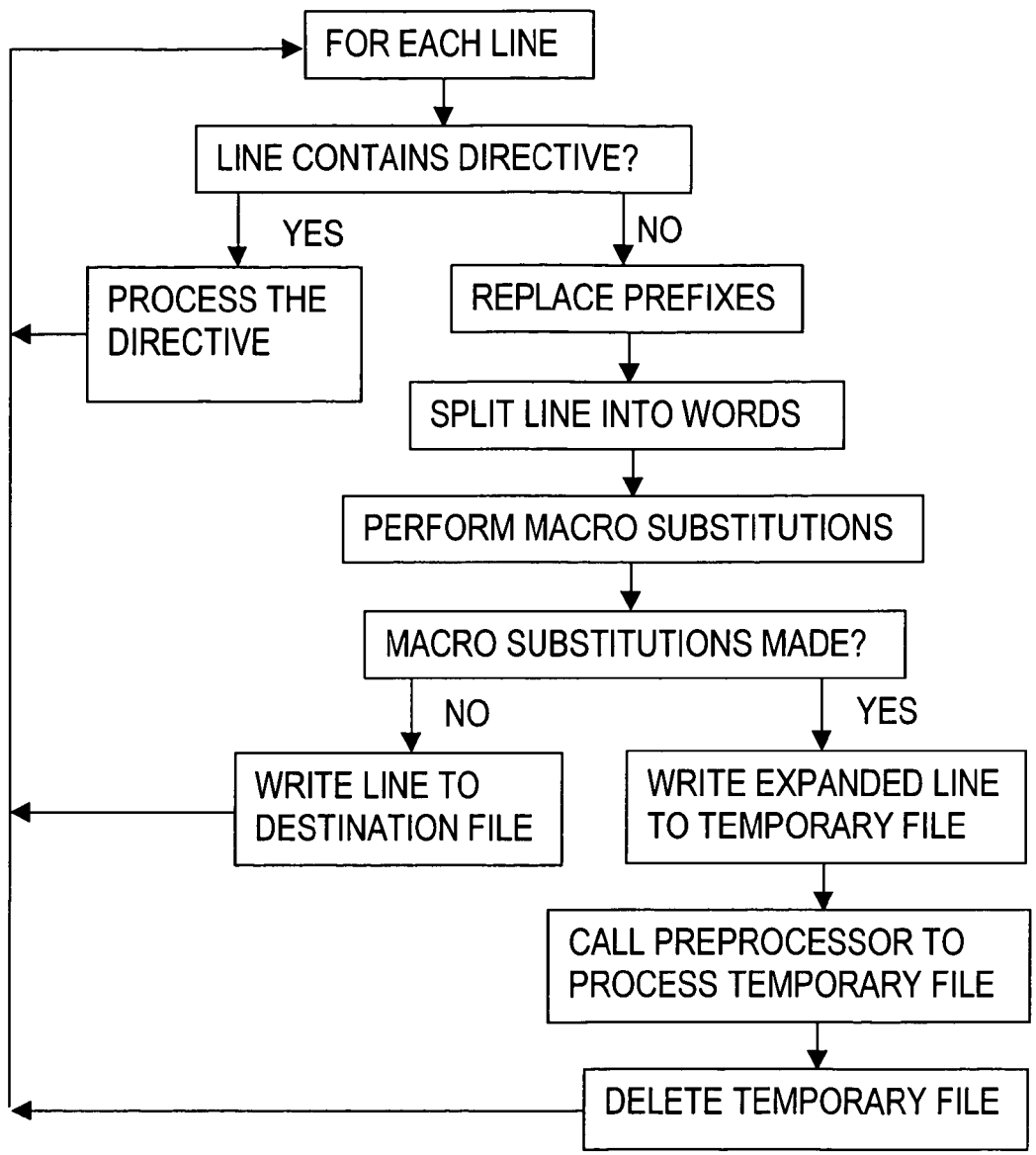
FIG. 2 is a flowchart of a preprocessor used in the method.

For example, the ordering of the clauses within an SQL INSERT statement to insert records into a table varies between databases. The #template directive allows the developer to specify an INSERT statement independently of the target database, by means of the following code:

template<template name>
 #INSERT_INTO
 <insert-text set>
 #SELECT
 <select-text set>
 #FROM
 <from-text set>
 #end_template Pre-Processor The pre-processor program 12 will now be described in more detail, with reference to FIG. 2.

The pre-processor program steps through the source file 11, a line at a time. For each line, the pre-processor checks whether the line contains a directive. If a directive is found, it is processed, as follows:

- In the case of a directive that generates SQL code (such as #aggregate_table) the pre-processor accesses the data models 10 to pull information from them about the structure of the source and destination tables, and to read any relevant annotations. It then uses this information to generate the required SQL code. The pre-processor also inserts comments in the generated code, to make it easier for the software developer to understand and modify the code. The generated code is written to a temporary file, and the preprocessor then recursively calls itself, to process this temporary file.
- In the case of a #define directive, the macro definition is added to a list of macro definitions.
- In the case of a #prefix directive, the prefix is added to a list of prefixes to be substituted.
- In the case of an #include or #template directive, the pre-processor temporarily stops processing the file currently being processed, and recursively calls itself to process the specified include file or template file.

If, on the other hand, the line does not contain a directive, the pre-processor proceeds as follows.

First, the pre-processor looks for any prefixes in the line, and tests them against the list of prefixes. If a prefix is listed, the required prefix substitution is performed.

Next, the pre-processor splits the line into words, by identifying a predetermined group of characters on which words should be broken. This group includes spaces, tabs and newlines as well as quotes, brackets and a number of other non-word characters.

Each word is then tested against the list of macro definitions that have been declared. If a macro has been declared for any of the words, the macro is expanded, by substituting the specified replacement text.

If any macro substitutions have been made, the expanded line is written to a temporary file. The pre-processor then recursively calls itself, to process the temporary file. Thus, nested macros (including directives within macros) can be expanded. When the temporary file has been processed, it is deleted.

If, on the other hand, no macro substitutions were made, the line is simply appended to the destination file 13.

The output of the pre-processor 11 is a destination file 13, which contains the SQL code for loading and performing other processing operations on a database. This file is complete and ready to run. If desired, critical sections of the code may be hand-crafted, rather than by using directives to generate them, so as to achieve higher performance.

Run-Time Processing

As stated, the output of the pre-processor is a file containing SQL code. However, some of the requirements for the SQL code may not be known until run-time (i.e. until the code is actually executed). For example, the way in which the data is to be physically stored on disks may not be known, since the database storage strategy may regularly be changed and refined. This problem is handled as follows.

Whenever a directive, such as #create_table, generates SQL code to explicitly create a table, the pre-processor inserts a special macro, referred to herein as an run-time processor (rtp) macro, in the place of the storage clause. The storage clause describes how the data in the table is to be physically stored. An rtp macro can specify a list of storage scheme identities (some of which may be non-existent). The storage scheme identities are listed in order of preference.

A storage scheme file 16 is provided, containing a set of current storage schemes. This file can be modified by the end-user as required. For example, if the user adds more disks to the system or changes the database storage strategy, the storage schemes may be updated to reflect this.

At run-time, a run-time processor 17 scans the code, looking for rtp macros. When it finds an rtp macro, it searches the storage scheme file 16, to find a storage scheme specified in the macro, starting with the most preferred scheme. If none of the storage schemes specified in the macro exists, a default scheme is chosen. The selected scheme is then used to generate a storage clause, which is added to the code.

The use of rtp macros in this way means that specification of the physical storage of the data can be deferred until run-time; in other words, it is performed "just in time". This avoids the need for having to re-build the entire code every time the storage strategy changes: only the storage scheme file needs to be changed.

Some Possible Modifications

It will be appreciated that many modifications may be made to the system described above without departing from the scope of the present invention. For example, other languages such as C or Java may be used in the source files, include files and template files. Also, other modelling tools may be used to generate the data models.

Although the run-time processor has been described in relation to storage schemes, its technology could also be applied to any other task that needs to be completed just in time.

CONCLUSION

In summary, it can be seen that the method described above provides a way of generating code for loading data into multi-dimensional databases which enables high performance, flexible solutions to be developed for different database models, using different relational databases running on different operating systems, from a single common technology. It addresses the requirement for a method of rapid, reliable generation of high-performance code to load data into such databases.

Experience has shown that using directives as described can reduce the size of the code required by a factor of 15, averaged over a whole project. In some areas the factor is around 35. Additional benefits are extremely cost-effective development and ongoing support.

What is claimed is:

1. A computer-implemented method for generating code for loading a multi-dimensional data warehouse from a plurality of source databases, the method comprising the steps:
   (a) defining the multi-dimensional data warehouse and the source databases as a set of entity-relationship data models;
   (b) creating a source file containing instructions for loading the multi-dimensional data warehouse from the plurality of source databases, the instructions including a plurality of high-level directives, said high-level directives including an aggregation directive specifying that data from a specified source table within said source database is to be aggregated into a specified destination table within said data warehouse;
   (c) automatically pre-processing said aggregation directive by
      (i) accessing said data models to pull information from said entity-relationship data models about the structures of said source table and said destination table, and
      (ii) using said information to generate code for aggregating data from the source table into the destination table; and
   (d) appending said code to an executable destination file.

2. A computer-implemented method for loading a multi-dimensional data warehouse from a plurality of source databases, the method comprising the steps:
   (a) defining the multi-dimensional data warehouse and the source databases as a set of entity-relationship data models;
   (b) creating a source file containing instructions for loading the multi-dimensional data warehouse from the plurality of source databases, the instructions including a plurality of high-level directives, said high-level directives including an aggregation directive specifying that data from a specified source table within said source databases is to be aggregated into a specified destination table within said data warehouse;
   (c) automatically pre-processing said aggregation directive by
      (i) accessing said data models to pull information from said entity-relationship data models about the structures of said source table and said destination table, and
      (ii) using said information to generate code for aggregating data from the source table into the destination table;
   (d) appending said code to an executable destination file; and
   (e) running the code in the executable destination file, to load the multi-dimensional data warehouse from the plurality of source databases.

3. A method according to claim 2 including the step of providing a storage scheme file containing a set of current physical data storage schemes, and wherein said step of creating the source file includes inserting at least one run-time processor macro into the source file, said run-time processor macro identifying at least one of said storage schemes, and wherein said step of running the code includes searching said storage scheme file to find one of said storage schemes identified by said run-time processor macro and replacing said at least one run-time processor macro with a storage clause generated at run time from said one of said storage schemes.

4. A computer system comprising:
   (a) a set of entity-relationship data models defining a multi-dimensional data warehouse and a plurality of source databases;
   (b) a source file containing instructions for loading the multi-dimensional data warehouse from the plurality of source databases, the instructions including a plurality of high-level directives, said high-level directives including an aggregation directive specifying that data from a specified source table within said source databases is to be aggregated into a specified destination table within said data warehouse;
   (c) pre-processing means for automatically pre-processing said aggregation directive by
      (i) accessing said data models to pull information from said entity-relationship data models about the structures of said source table and said destination table, and
      (ii) using said information to generate code for aggregating data from the source table into the destination table;
   (d) means for appending said code generated by pre-processing said plurality of high-level directives to an executable destination file; and
   (e) processing means for running the code in the executable destination file, to load the multi-dimensional data warehouse from the plurality of source databases.

5. A computer readable medium, holding a computer executable program for performing a method for generating code for loading a multi-dimensional data warehouse from a plurality of source databases, defined as a set of entity-relationship data models, the method comprising the steps:
   (a) creating a source file containing instructions for loading the multi-dimensional data warehouse from the plurality of source databases, the instructions including a plurality of high-level directives, said high-level directives including an aggregation directive specifying that data from a specified source table within said source databases is to be aggregated into a specified destination table within said data warehouse;
   (b) automatically pre-processing said aggregation directive by
      (i) accessing said data models to pull information from said entity-relationship data models about the structures of said source table and said destination table, and
      (ii) using said information to generate code for aggregating data from the source table into the destination table; and
   (c) appending said code to an executable destination file.

* * * * *